Patented May 11, 1954

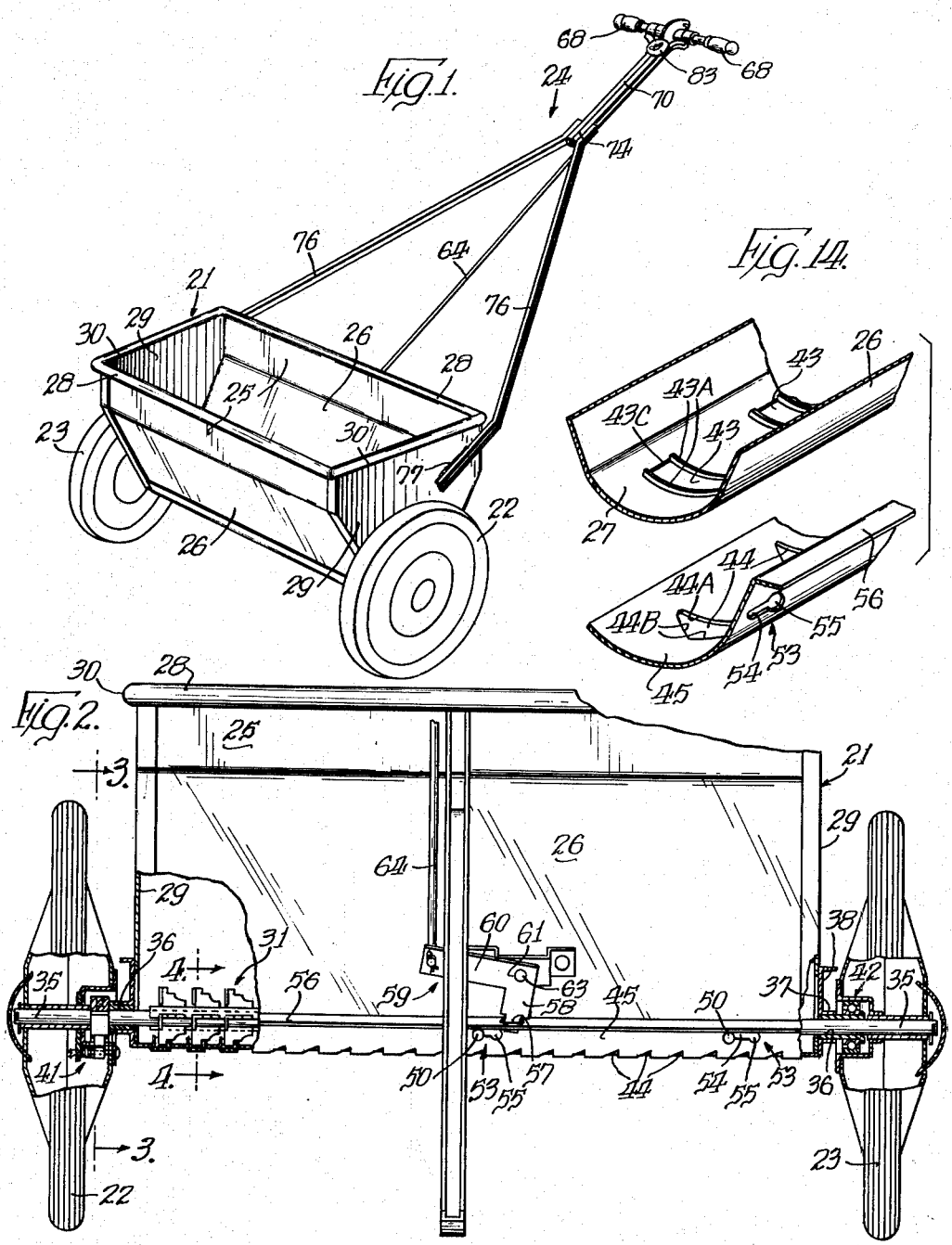

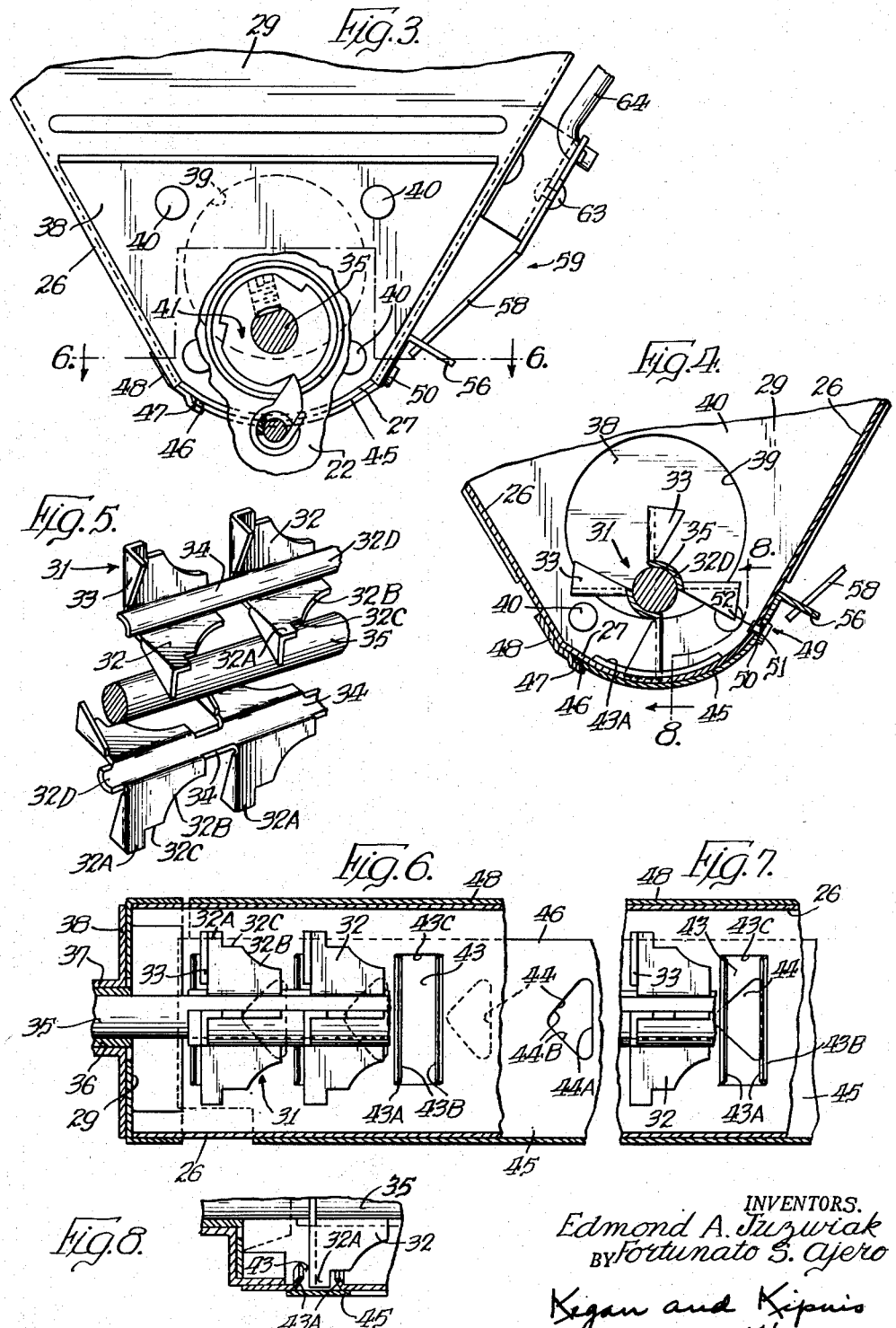

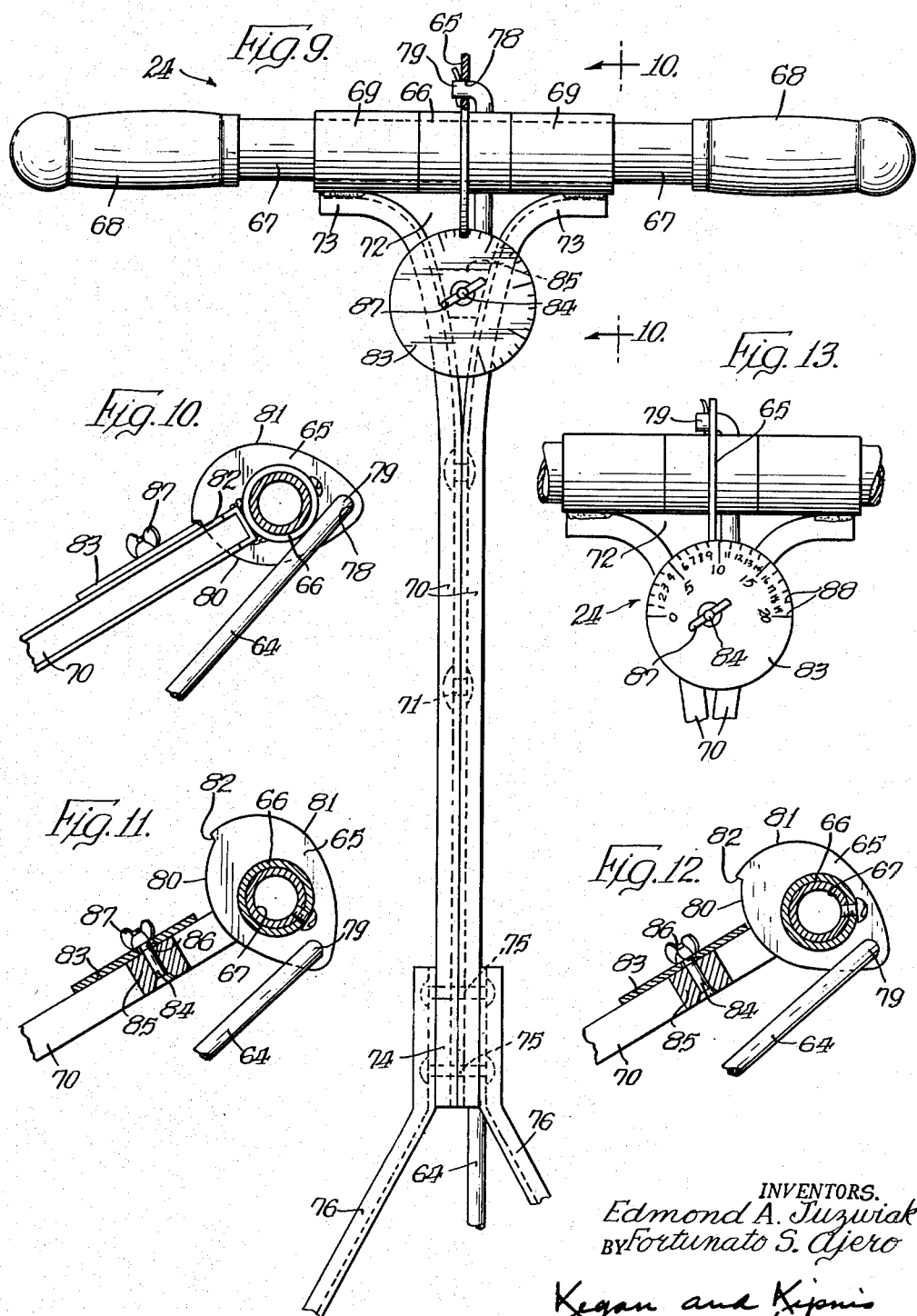

2,678,145

UNITED STATES PATENT OFFICE 2,678,145

HAND OPERATED FERTILIZER SPREADER

Edmond A. Juzwiak, Chicago, Ill., and Fortunato S. Ajero, Bridgeport, Pa., assignors, by mesne assignments, to Avco Manufacturing Corporation, New York, N. Y., a corporation of Delaware Application May 22, 1952, Serial No. 289,282

10 Claims. (Cl. 222—177)

The present invention relates to material spreaders and particularly to a hand operated unit to spread materials such as fertilizer or seed over gardens, lawns, golf courses and the like.

Several of the modern fertilizer materials are very strong, so that small amounts thereof must be distributed with great regularity and care, in order to avoid the so-called burning of plants by local overdosage. Certain grass seeds are even more exacting as to desired uniformity. For instance it may be necessary to distribute as little as one-eighth of a pound over an area of one hundred square feet. It is likewise necessary to avoid the obvious disadvantages of local underdosage. In the past, however, certain difficulties have interfered with the desired uniformity of distribution.

One of these difficulties is connected with the fact that the typical application involves frequent turning, reversing and directional adjusting of a hand-operated spreader device. The lawns, parkways, lawn edges, etc., often have complicated outlines and forms. Corners must be covered, tree trunks must be avoided, and intricate traveling patterns must be followed. The hand guided machine usually runs on two wheels and is too heavy to be lifted off from the ground. For this reason the required directional adjustments, etc., usually involve repeated forward, backward and turning operations. It is very undesirable that fertilizer should be distributed during such an adjusting operation in the same manner as during the regular forward pushing of the fertilizer spreader. Heretofore this was hard or impossible to avoid. The new device provides improved means for the control of fertilizer distribution, particularly incident to the directional adjusting operations as mentioned.

Hand or power operated machines with various controls have been made and proposed in the past, but we believe our new machine is not only simpler and cheaper than comparable earlier ones but at the same time more efficient. It avoids psychological and physiological shortcomings involved in manual operation of earlier machines. In the past it was necessary for the operator, in order to control the distribution of fertilizer at certain spots, either to remove one hand entirely from the pushing handle or equivalent device, or at least partly to release his grip, for the purpose of manipulating auxiliary handles, triggers or the like. Such releasing of the normal two handed grip on the pusher bar necessitates deliberate and relatively slow operation. Moreover, such operation is physically much more tiresome than is the ordinary straight-lined pushing on of the machine. The present improved machine allows rapid and practically effortless manual performance of spreader controlling operations, simultaneously with the manual pushing of the distributor unit at any desired speed.

The mechanism which allows this novel and improved operation is formed of elements of the utmost simplicity. A cam element or subcombination, used in this unit, has similarity with a well known control device, utilized for entirely different purposes in motorcycles. This device cooperates with a calibration disc, which constitutes an improvement over that shown in the copending application Serial No. 159,013 of E. A. Juzwiak, now Patent No. 2,634,029, issued April 7, 1953.

The machine is also improved in regard to a problem of fertilizer distribution which arises from the fact that many of the materials to be distributed are irregular in physical constitution, both as originally shaped and in the form as used, that is, when they have been subject to atmospheric moisture and the like for certain periods of time. The openings through which the materials must be fed are often rather small; on the other hand any batch of fertilizer may tend to exhibit, or gradually to develop, a condition wherein it contains a mixture of very different particle sizes. Some particles tend to conglomerate as pebbles of substantial diameter, while others are present as more or less free-running powders. Various intermediate sizes are frequently present in the fertilizer bin. The larger particles and pebbles often tend to clog the smaller feed openings. Furthermore such clogging is often promoted by the fact that the finely powdered and moisture absorbing materials are projected against and into the corners of the feed openings, thereby causing gradual blinding and clogging of such openings. In relatively large fertilizer spreaders, pulled and actuated by tractors and the like, considerable improvements have been made in these respects in recent years. However, the modern devices in question have been found inapplicable to hand operated spreader units. We have found that the mere expedient of making the unit and its component parts proportionately smaller, or approximately so, is quite insufficient to produce any comparable uniformity and excellence of fertilizer distribution. The reasons for this fact are not as simple as they might appear at first blush, and we do not want to be bound by any more or less theoretical explanation that we are giving; however we might say the following: The solution of the clogging problem in hand-operated spreaders requires a material distribution and a charging of feed openings in manner somewhat similar to those used in the larger machines referred to, but it also requires a discharging of the material from the feed openings which is vastly different. We found that in manual machines we can and to some extent must rely on pneumatic rather than mechanical actuation, for the discharge operation. After experiments with numerous agitating and feeding elements and the like we have developed a simple manual unit for all the distributing, charging and discharging operations referred to, which we have found superior to earlier units of this general type.

Thus it is a principal object or feature of our invention that we provide a hand operated fertilizer spreader which allows an adequate and rapid control of fertilizer distribution with a minimum of muscular fatigue and psychological confusion.

Another important feature of our invention is that it provides improved distribution, charging and discharging of fertilizer materials, either homogeneous or heterogeneous as to size, within the small bin of a manually operated machine. This is achieved largely by means of a new, simple and economical but highly efficient agitator mechanism.

Of course, even the most perfect mechanism which can be constructed for these purposes requires occasional cleaning and servicing. Therefore it is an object of our invention to produce a hand operated unit of the type as described which simplifies such cleaning and maintenance. For this purpose the new unit is formed of a minimum number of parts and these parts are so designed as to be most readily accessible, and partly separable. In this respect the invention comprises an improvement over that disclosed in the copending application Serial No. 214,788 of F. S. Ajero.

The general object of the invention is, to form a manual fertilizer spreader, and its component parts, as simply and inexpensively and at the same time as sturdily and efficiently as possible.

The manner in which these and other objects have been achieved will be understood more clearly upon a perusal of the detailed description of a preferred embodiment which follows, in conjunction with the drawing wherein this embodiment is shown in detail. For purposes of clarity and exposition the following description and explanation is purposefully explicit and the drawings provide detailed illustration; but it is to be distinctly understood that the description and illustration are exemplary only and that the scope of our invention is limited only by the appended claims.

It should also be noted that while the unit is designated as "fertilizer" spreader, and primarily useful as such, the term "fertilizer" is not only broad enough to cover a great variety of substances, either powderous or granular or otherwise, but is furthermore referred to only for the purpose of designating one typical function and utility of the spreader. The unit is applicable also for the distribution of granular or powdered weed inhibitors, insect control materials, and other similar materials which may be distributed from hand operated spreaders, including also grass seed and possibly a variety of other substances. It is largely in connection with this great diversity of materials handled that the new control features of our invention are practically important.

In the accompanying drawings:

Figure 1 is a perspective view of a basic embodiment of our invention.

Figure 2 is a fragmentary rear elevational view of the same device with parts broken away and other parts in section.

Figure 3 is an enlarged sectional detailed view taken approximately on line 3—3 of Figure 2.

Figure 4 is a similar view taken approximately on line 4—4 of Figure 2.

Figure 5 is an exploded fragmentary perspective view illustrating a portion of the agitator shaft and agitator forming part of the new device.

Figure 6 is a fragmentary sectional plan view taken approximately on line 6—6 of Figure 3.

Figure 7 is a view resembling Figure 6 but showing the parts in a changed position.

Figure 8 is an enlarged sectional detailed view taken approximately on line 8—8 of Figure 4, Figure 9 is an enlarged fragmentary plan view of the pusher handle and shutter control for the unit forming part of the device, Figure 10 is a sectional detailed view taken approximately on line 10—10 of Figure 9, Figure 11 is a view generally similar to Figure 10 but showing the parts in different positions, Figure 12 is still another similar view showing still another position of the parts in question, Figure 13 is an enlarged plan view of the eccentric control disc forming part of the invention, and Figure 14 is an exploded fragmentary perspective view illustrating a portion of the bottom panel and shutter plate of the distributor bin.

Referring now particularly to Figures 1 and 2, it will be noted that the new hand operated fertilizer spreader comprises a reservoir hopper or bin 21 supported on and by a pair of wheels 22, 23 and adapted to be pushed manually by a pusher handle 24, in substantially the same manner as any small pushcart or manual grass mower is operated. The front and back walls of the fertilizer bin 21 may be formed of sheet metal and may comprise upper vertical wall portions 25 and lower inclined converging wall portions 26. The bottom of the bin is formed by a plate or panel 27 curved as a cylindrical arc concave to the top and suitably joined to the lower edges of the walls 25, 26. The top edges of the walls 25 desirably have reinforcing and rounded flanges or beads 28. Likewise the end walls 29 of the bin 21 may have such flanges or beads 30.

The overall size of the bin 21 is such as can be handled conveniently by means of manually pushed handle 24; in other words the length of the bin, from one wheel 22 to the other 23, equals approximately once or twice the typical length of the human arm. The two other overall dimensions of the bin, its height and its extension in the direction of its travel, usually are smaller. The wheels are desirably of caster size, as used also in lawnmowers, wheelbarrows and the like. The pusher handle 24 extends backwards-upwards to an elevation suitable for manual pushing, such as about 3 feet from the ground.

A series of agitators 31 are disposed in the lower part of the reservoir bin and co-axially aligned with one another in a horizontal direction parallel with the length of the bin. Each agitator comprises a number of vanes 32 desirably formed from sheet metal and reinforced by integral ribs 33. By means of preferably integral hub segments 34 these agitator vanes are secured to an agitator shaft 35, the ends of which serve also as mounting means for the wheels 22, 23. Bushings 36, which serve as bearings for the agitator shaft, are held in housings 37 secured to plates 38; and these plates cover access apertures 39 in the hopper end walls 29. Each end wall has such a plate attached thereto by bolts 40, thereby providing a bearing for the agitator shaft adjacent the end of the shaft.

At least one and preferably only one of two wheels, in the illustration the left hand wheel 22 as seen by the operator, is connected with the agitator shaft 35 by means of a conventional one-way clutch 41. This clutch is so arranged that forward rotation of the wheel 22, that is, the rotation resulting from forward pushing of the entire unit by the handle 24, will transmit rotatory power to the agitator shaft 35, whereas little or no power is transmitted to said shaft by reverse rotation of the wheel 22. The other wheel, as shown the right hand wheel 23, is desirably supported on the shaft by means of ball bearings 42 so that free-wheeling will take place regardless of the direction of rotation and travel.

By means of this arrangement the following features are obtained. The agitators 31 are rotated against the resistance of fertilizer or the like in the reservoir bin, when and as the spreader is being pushed forward. The agitators are practically at rest when the spreader is being pulled backwards. They are also at rest when a backward arc is performed around either wheel 22 or 23, and when a forward-leftward arc is performed around the clutch-connected wheel 22. The only arcuate motion of the unit which transmits power to the agitators is the forward-rightward one around the freewheeling wheel 23. We have found that these features by themselves contribute much to the convenience, rapidity and accuracy of fertilizer distribution. After a very short trial period these features enable a reasonably skillful and intelligent operator to operate the spreader unit properly around and over many if not all of the irregular ground portions which are encountered in typical garden work.

In addition, the new unit provides a simple and effective means to adjust the size of the feed openings 43 in the bottom plate 27 by suitable shifting of cooperating openings 44 in a movable shutter plate 45. Generally speaking this type of openings in bottom and shutter plates is well known; however the new unit provides a particularly simple and effective mechanism for adjusting the effective opening sizes to the different materials used, for removing and reinstalling the shutter plate in order to clean and inspect the different parts, and for manually switching from a predetermined open position partly or entirely to a closed condition of the openings, with rapidity and accuracy and without psychological or physical effort. This mechanism will now be described.

*Shutter plate and shutter control*

The shutter plate 45 is formed from a substantially rectangular strip of sheet metal. It has a curvature which in the installed condition of the shutter plate is substantially identical with the curvature of the bottom wall 27. It is desirable that the upper surface of the shutter plate should contact the lower surface of the bottom plate with close surface contact and with wiping motion incident to any shifting of shutter plate, in order to minimize interception of fertilizer particles, dust and the like between the two plates. It is therefore preferred that the shutter plate 45 in its free and uninstalled condition should have a larger radius of curvature than does the bottom plate 27 so that the shutter plate, mainly in its middle portion, is forced against the bottom plate with some resilient pressure when the shutter plate is held to the reservoir bin by suitable retainer means.

Marginal retention of the shutter plate is provided at one of the long edges, 46, of the shutter plate. This edge is in sliding contact with a long, narrow shoulder 47, formed by a long retaining strip 48 secured to the reservoir bin, adjacent the bottom end of the front wall 26. The other long edge portion of the shutter plate is retained by a plurality of stud pins 49. This arrangement allows removal and reinsertion of the shutter strip 45 without extension of the shutter strip, relative to the bin, over the entire length of the strip. Thus it becomes very simple to remove and reinsert the shutter plate, which may have to be done in a cramped tool shed or otherwise in close quarters. Two stud pins 49 are shown, although a different number of such pins can be used.

Each stud pin has a flat head 50 spaced outwardly from the outer surface of the reservoir bin by a distance which is but slightly greater than the thickness of the shutter strip. Each stud pin has a neck 51 and a foot 52, which foot is suitably secured to the reservoir bin, preferably adjacent the lower edge of the rear wall 28, by some suitable process such as welding, riveting or threaded engagement. In the shutter strip as shown two keyhole type openings 53 are provided, each of which has a narrow part 54 extending lengthwise of the strip and a wide part 55 at one end of the narrow part; the spacing of the wide parts coinciding with the spacing of the stud pins 49. The length of each narrow keyhole part 54 slightly exceeds the required adjustment stroke of the shutter plate; that is, it slightly exceeds the extension of the feed discharge openings 43 and 44 in a direction lengthwise of the bottom panel 27.

By means of the freely sliding guide edge 46 and guide shoulder 47 and by the additional guidance of the stud pins 49 and keyholes 53, the shutter plate 45 allows the hopper openings 43 to slide relative to the shutter openings 44, from a position O, where each pair of openings 43, 44 is wide open, to a position C where these openings are being closed. The closed position coincides with the end of the keyhole, opposite the wide opening. The narrow part of each keyhole extends slightly beyond the terminal point O of the adjustment stroke.

The shutter plate 45 is longitudinally reinforced and also manipulated by means of a flange 56 extending along the edge portion in which the keyholes 53 are formed, this flange being bent away from said edge portion and from the plane of the reservoir bin. An opening 57 is formed in this flange and the short arm 58 of a bell crank 59 extends into this opening. The bell crank 59 is disposed in a plane generally parallel to the adjacent hopper wall surface 26, which plane accordingly slopes upwardly and rearwardly of the reservoir bin. Thus the long arm 60 of the bell crank 59 is movable in a manner easy to control from the pusher handle 24. The angle portion 61 of the bell crank has a hole formed therein, whereby it is pivoted on a pin 63 which is directly or indirectly secured to said hopper wall 26.

A control rod or control link 64, approximately as long as the pusher handle 24, has one end engaging the free end of the long arm 60 of the bell crank, and an other end engaging the rear end of a lever 65. This lever is generally disc shaped. It is carried by the rear end of the handle 24 and is disposed and movable in a vertical plan parallel to those of the wheels 22, 23. The entire normal control of the shutter plate 45 is effected with the aid of the disc lever 65. For this purpose a sleeve 66, normal to and extending through the disc lever 65 and secured thereto as by welding, is coaxially secured to the middle portion of a handle bar 67 forming part of the pusher handle 24. This handle bar may be formed of steel pipe, and may have conventional handle grips 68 of rubber or the like at both ends. Between each handle grip 68 and the sleeve 66 a journal 69 for the handle bar 67 is provided, so that the bar, and thereby the disc 65, can be turned about its axis.

In order to form the upper part of the pusher handle and control unit 24 with the required strength while providing the required space for the operation of the disc lever 65, we may use a pair of channels 70 having their flanges extending away from one another and having their web portions joined together as indicated at 71, for instance by spot welding or riveting. An open space 72 is formed between the upper ends 73 of both channels, which are bent laterally. Each end 73 has one of the journals 69 secured thereto, preferably by welding; the journals 69 having a common axis lying in a horizontal direction parallel with the shaft 35.

The lower ends 74 of the channels 70 are secured, for instance by bolts or rivets 75, to yoke members 76 extending in oblique directions toward the end walls 29 of the reservoir bin and secured thereto as by welding 77.

The entire handle and control unit 24 comprising the lower yoke members 76, the intermediate channel members 70, the upper yoke 73 and the transverse handle bar 67 with the different parts mounted thereon, forms an assembly symmetrical with the hopper unit 21 about the short axis of that unit. This assembly lies in a single plane approximately parallel with but slightly above the planes occupied by the control rod 64. Thus the control rod 64 is protected from injury due to bending or the like, even when the spreader unit is exceptionally used as a pushcart for crates, tools or the like. Such items can be supported on the upper edges 28, 30 of the bin 21 and the lower fork members 76.

In order to allow accurate shutter control the back part of the disc lever 65 has a hole 78 for the end piece 79 of the control rod 64, while the front part of the disc lever has a cam surface 80 forming part of the edge of the generally disc-shaped member 65. In the arrangement as shown this cam surface may be spiral or involute. It extends over a minor part, such as 60 degrees, of the disc circumference. The remainder 81 of this edge is shaped in any suitable manner; preferably in a smoothly rounded curve around the central sleeve 66. A shoulder 82 extends outwardly from one end of the cam surface 80 to the back surface 81, in a direction generally radial of the sleeve 66. These configurations are used for purposes which will be explained presently.

A flat, generally disc-shaped, preferably circular shutter calibrator member 83 is secured to the handle and control unit 24, adjacent to and in front of the cam or disc lever 65. The disc 83, by means of a stud 84 secured to a boss 85, is mounted on the upper yoke 73. The stud 84 lies in the plane of the disc lever 65. The disc 83 has an eccentric hole 86 engaging this stud 84. The disc 83 is normally secured to the upper yoke of the handle unit 24 by a wing nut 87 engaging this stud. On a part of the upwardly facing peripheral part of the disc 83 we provide radial graduations 88, preferably at uniform angular distances from one another, and suitable legends for these graduations, such as the numerals "1" to "20." These graduations and numerals are made large enough to be readily legible by a person having normal eyesight who holds the handle grips 68 in order to push the unit over his lawn or other ground. By this expedient, inadvertent use of a wrong type of fertilizer can be avoided with particular safety.

The numeral "1" is preferably applied to a graduation on that part of the disc periphery which is close to the eccentric hole 86; and the series of graduations marked "1" to "20" may extend, most simply, over about 180 degrees of the disc periphery, starting from this numeral "1." In this manner, plain washer stock can be utilized to form an efficient calibrator. The circular form of this calibrator is particularly safe and suitable for a manual unit.

The disc 83 may lie substantially in the aforementioned plane of the handle unit 24. It lies, more particularly, in a plane which intersects the cam surface 80 on the disc lever 65. Manifestly the exact point of intersection between the periphery of the tiltable cam surface 80 and the periphery of the eccentric disc 83 depends on the angular adjustment of both members 65 and 83 in their respective planes of operation. So long as the wing nut 87 is loose, any one of the radial graduations 88 can be brought into intersecting position with the disc 65. Thereafter, the wing nut is normally fastened, thereby providing a certain "O" position for the shutter 45.

In the embodiment as shown, where the axis of the disc lever 65 lies below the plane of the eccentric disc 83 and the radii of the curve 80 (measured from 66) have maximum length at 82. The short radius graduations of 83, adjacent point "1," correspond with a "small fertilizer particle" setting of the shutter 45, that is, with a minimum distance between the pertinent "O" position and the fixed "C" position of the shutter. The long radius graduations adjacent point "20" correspond with a "large particle" setting.

Thus it is possible in the simplest and safest manner to adjust and re-adjust the shutter for different open or "O" positions, and thereby to adapt the entire unit for the distribution of different fertilizers, etc. These adjustments and re-adjustments can be effected at the freely accessible hand grip end of the pusher and control handle 24, without special tools and without resort to difficult, laborious or inconvenient operations. In fact the entire shutter unit and control apparatus for the same is freely adjustable and serviceable in this manner. An infinite number of settings is available, by means of the smooth, circular periphery of the control disc.

When any setting of the disc 83 is once established and the wing nut 87 is drawn to tighten and secure this setting the disc lever 65 remains free to be rotated to its extreme "C" position of shutter closure by clockwise rotation. (The terms "clockwise" and "counterclockwise" are used to designate rotary directions as seen from the left of the unit; see Figures 10 to 13.) This "C" position of the lever is shown in Figure 11. The lever is also free to be rotated, counterclockwise, to an "O" position of shutter opening for which the plate 83 has been set. Such a position is shown in Figure 12. In the normal operation of the spreader unit this latter position is maintained. This is best achieved by grasping the grips 68 so as to maintain a slight but positive, resilient, counterclockwise torque on these grips and thereby on the disc lever 65, incident to the forward pushing of the unit. Whenever the distribution shall be slightly reduced below the normal setting this can be achieved with fair accuracy, by a slight raising of the handle and control unit 24, while continuing the forward pushing of the spreader. When forward pushing shall be continued but fertilizer distribution temporarily interrupted completely this can be done by further raising of the handle and control unit 24 and/or extreme twisting of the grips 68, to the point where the keyholes 55 and stud pins 49 in their relative sliding movement reach the fully closed position C.

When the plate 83 is set for large fertilizer particles, by bringing graduations such as "18" or "19" to the top and fastening the plate in such condition, the wide open or "O" position of the shutter is established at a point of the cam surface 81 adjacent the shoulder 82. In such cases the available angle of adjustment of the disc lever 65 between the "O" and "C" positions (Figures 10 and 11) is relatively wide. At a small particle setting such as "1" or "2," this angle is relatively narrow. These angles of adjustment can easily be kept within a range, desirably somewhere between 15 and 60 degrees so that the widest adjustments for large particles (about 60 degrees) are easily manipulated by means of the twisting and raising of the hand grips 68, while there is provided a sufficient twisting range (about 15 degrees) for the smallest particle setting. Thus the adjustments are always sufficiently positive to avoid interference by any accidental raising or lowering due to unevenness in the ground traversed with the spreader unit. The open and plainly legible arrangement of the disc 83, together with the equally open arrangement of the cam, facilitates determination, during the distributing process, of the degree of closure applied at every moment.

In order to safely avoid any shutter opening beyond the desired point "O" for maximum size particles, and any resulting loss of engagement between the stud pins 49 and the narrow keyhole parts 54, said limit point "O" for maximum size particles (setting "20") is safely maintained by the aforementioned shoulder 82 on the disc lever 65.

*Agitator unit*

The agitator unit generally designated by numeral 31 is located in the lower part of the bin 21. The somewhat limited energy obtainable from the manual pushing of the wheeled spreader is applied by this agitator unit to the granular or powdered material in the direct vicinity of the feed openings 43, 44. Preferably the overall diameter of the agitator 31 is relatively small as compared with that of the cylindrically curved bottom plate 27, as well as in comparison with the overall height of the bin 21. This relative smallness of the agitator unit also facilitates insertion and removal of the agitator through an access aperture 39. Furthermore the relative shortness of the maximum radius of the agitator vanes is important for the normal operation of the unit, as will now be explained.

The agitator shaft 35 is desirably installed a slight distance below the axis of curvature of the bottom plate 27. This arrangement, together with the relative shortness of the vanes, allows the outermost portions 32A of each vane to enter into and pass along the respective opening 43 in the bottom plate, not only to pass over and adjacent the upper and inner surface of the bottom plate. This will best be noted from Figures 4 and 8. In these figures together with Figure 6 it will further be noted that the outermost part 32A of each vane 32 has a straight terminal edge extending parallel with the agitator shaft 35 and being approximately as long as the corresponding rectangular bottom opening 43 is wide. In the embodiment as shown four vanes 32 constitute one agitator unit, being arranged in substantially uniform planes of rotation. All agitator units illustrated have vanes tapering from their outermost portions 32A in one and the same direction along the shaft 35 toward the right side of the unit. The tapering edge 32B of each vane is shown as being cut off in form of a circular arc, although it can have a variety of other forms.

There is also shown an offset 32C between each outermost portion 32A and the respective tapering edge portion 32B; this offset being approximately co-extensive in an axial direction with the extension of an inwardly raised, beveled shoulder 43A along one of the long sides 43B of each bottom opening 43. Both long sides 43B along each of these openings has such a raised edge 43A but only one of said offsets 43C is required, on one side of the outermost vane portion 32A; the other side of said portion 32A being shown as radially directed and merely provided with the perpendicularly bent reinforcement rib 33. The short and laterally extending sides 43C of the rectangular feed openings 43 have no upstanding edges like those shown at 43A, in order to facilitate the entrance and exit of the vane portions 32A in the rotation of the agitator unit.

The feed openings 44 in the shutter plate 45 are shown as being triangular and having one long side 44A extending parallel with the long sides 43B of the inner openings 43, and parallel with the direction of forward travel. The other two sides 44B of each shutter opening 44 have equal lengths. In the embodiment shown these equal sides include a blunt angle. All three angles of openings 44 are slightly rounded. In these respects, of course, a number of variations can be applied, as is well known to the art.

In the fully closed "C" position of the shutter, shown in Figure 6, the apex of each triangle 44 is positioned at or slightly beyond the right hand long edge 43B of each feed opening 43 in the bottom plate 27. This is the position obtained by the closing motion of the control handle grips 68 (see in Figure 11). When the control disc 83 is set for maximum opening "20" the lever disc can be turned counter-clockwise to the position shown in Figure 10, at which time the shutter openings 44 have been displaced toward the left into the position shown in Figure 7, exposing the entire triangular area and allowing maximum feed. In most practically used positions of the control disc 83, the "O" position of the shutter is somewhere between the extreme positions of Figure 6 and Figure 7, and fertilizer discharge takes place through a more or less limited apex portion of each triangular opening 44, such open portion being limited also by the right hand long edge 43B of the respective stationary opening 43.

In such normal, open positions of the shutter, and pursuant to forward motion of the spreader unit and resulting rotation of the agitator units, successive outer vane portions 32A pass into and along the stationary openings 44. The resulting charging and discharging of the feed openings will best be understood when first considering the action as taking place simply in the presence of air. Each four vane agitator unit can then be considered as a small blower having a discharge end 32A and a suction end 32B. Since the suction ends of successive blowers are disposed closely adjacent the discharge ends of preceding blowers, as shown in Figures 2 and 6, there is a tendency to create a small but positive eddy in the zone occupied by and surrounding each agitator unit, such eddy moving outwardly at the discharge portion 32A and inwardly through the suction zone. In the lowermost part of the bin these eddies are progressively confined by the aforementioned convergent and concave forms of the front and back walls and bottom plate, whereby the eddy velocities, in the plane of rotation, are at a maximum in this lowermost zone. Further local speeding up and concentration of the eddy motion is obtained by the reinforcing flanges 33 and the upstanding flanges 43A. Thus it will be seen that practically all of the air drawn into each eddy by the suction zone 43B is directed into, and initially along the elongated opening 43, by the vane discharge portion 32A. If and when an open apex area or triangular area of the shutter opening 44 is encountered by one of the outer vane portions 32A a blast of air is ejected through such open area.

If it now be assumed that the bin is filled with a homogeneous powdered mass it will be appreciated that, while the exact velocities and directions of the eddy motions mentioned are slightly different, the different motions are generically the same as described and explained above. Thus it will be seen that the continued rotation of the suction area 32B and the successive approaches of discharge areas 32A to the entrance sides 43C of the discharge openings will charge these openings with the solid material in question. The vanes 32 and reinforcements 33 act like small scoops, in this operation. The successive actual passages of discharge portion 32A over the open apex or triangular areas of deep openings 44 result in the discharge of material previously charged, in form of a practically continuous stream.

So long as such material is assumed to be in a truly homogeneous condition, distribution within the hopper is a matter of indifference. Actually however, as explained above, the materials are frequently heterogeneous. In the presence of a heterogeneous mass the agitators act additionally as classifiers, concentrating the largest and heaviest particles in the zones of slowest motion, that is, insofar as the bottom area is concerned, in the areas outside of and protected by the inwardly upstanding flanges 43A. Such concentration of relatively large particles or pebbles is further facilitated by the curved configuration of the suction edges 32B as shown. Inasmuch as the prevailing motion is inherently spiral, the separated heavy and large particles are subject to continuous rolling motion, incident to which they are comminuted and gradually converted into particles small enough to be drawn into the suction and consequently discharged through the feed opening.

Very small and light powdered particles, as mentioned above, may tend to be projected into corners such as those adjacent the short sides 43C on the exit sides of the stationary openings 44; in other words there is an ever-present danger of overcharging of feed openings, mainly when the fertilizer materials are in such physical condition that they tend to be cemented together and to arch. The available air blast may then become incapable of breaking through the agglomeration. In the present unit such tendencies are counteracted not only by the aforementioned concentrated condition of the air blast discharge but also by the possibility of readily and frequently reciprocating or even oscillating the shutter 45 from fully closed to predetermined open position, either for the adjustment purposes mentioned or even for the very purpose of dislodging materials which tend to collect and arch. It will be seen that practically no interruption of the fertilizer distributing process is involved in such occasional shutter reciprocation, which is effected by mere flick of the wrist and which practically need not involve any interruption of the forward progress of the machine. In this respect the present hand operated unit is actually superior to the relatively refined and sometimes highly complicated mechanisms which are known for larger, power actuated spreader units.

It will further be seen that the spreader and agitator and its component parts can be produced from inexpensive materials and by inexpensive manufacturing procedures, while the required manufactured tolerances can easily be maintained.

Parts of the utmost simplicity can mainly be utilized for the manufacture of the agitator 31. Preferably, as suggested in Figure 5, this agitator is formed from two identical parts, each of which incorporates a succession of partial agitator units, spaced from one another by 90 degrees. Each partial unit comprises two agitator vanes 32 with their corresponding reinforcements 33. An arcuate hub element 32D interconnects the two angularly spaced vanes of each partial unit and also interconnects the successive, axially spaced, partial units. Thus it will be seen that each half of the agitator substantially consists in an elongated strip 32D with a series of characteristically profiled flaps 32 extending from and equally spaced along each side of the strip, these flaps being bent to include an angle of 90 degrees, and the strip 32D itself being bent to an arcuate form which is convexed to the quadrant included by said angle of 90 degrees. In the form as shown the characteristic edges of the flaps 32 extend first more or less radially away from the elongated strip 32D, in the reinforced portion 33, then parallel with the strip in the discharge portion 32A, and then more or less gradually back toward the strip in the tapered suction portion 32B, preferably with an interposed offset 32C as described.

The reinforcements 33 can be upset simultaneously on all vanes extending from one side of the strip and then simultaneously on all vanes extending from the other side of the strip; or by means of special machinery and dies the entire unit can be formed in a single compound operation. The manufacture of the agitator unit can be completed by spot welding the two halves to the shaft 35; a process wherein the proper angular and axial spacing of all vanes is easily obtained by suitable adjustment of the end portions. By means of the spot welding effected from both sides, undesirable warping of the shaft 35 is safely avoided.

Having thus disclosed and described one preferred form of our new hand operated fertilizer spreader, we claim our invention as follows:

1. A fertilizer spreader comprising a wheel-mounted bin; a structural frame rigidly secured to the bin and extending away therefrom, for the manipulation of the bin; an elongated shutter plate substantially co-extensive with the bottom of the bin, said plate and bottom having similarly spaced feed openings and said plate also having uniformly oriented key hole openings; stud pins secured to the outside of the bin and spaced similarly to the key hole openings in the plate, so that the plate can be mounted on and removed from the bin when the wide parts of the key hole openings coincide with the pins and that the plate when mounted on the bin can be reciprocated along the narrow parts of the key hole openings; and means mounted on the structural frame to control such reciprocation.

2. A fertilizer spreader comprising an elongated wheel-mounted bin; an elongated shutter plate substantially co-extensive with the bottom of the bin; said plate and bottom having similarly spaced feed openings and said plate also having a series of uniformly oriented key hole openings along one edge of the plate; a series of stud pins secured to the bin and spaced similarly to the key hole openings in the plate; a guide shoulder on the bin, parallel with the series of stud pins, so that the plate can be guided and retained by the shoulder and the pins; and means to reciprocate the shutter plate subject to such guidance.

3. A fertilizer spreader comprising a caster wheel-mounted bin having an arcuate bottom panel with feed openings therein; a normally arcuate shutter plate substantially co-extensive with the bottom panel and having matching feed openings; said plate also having uniformly oriented key hole openings disposed along at least one edge thereof; stud pins secured to the bin at locations matching the normal locations of the key hole openings; and means to slide the plate along the bottom panel.

4. A fertilizer spreader according to claim 3 wherein the shutter plate in its free position has a longer radius of curvature than does the bottom panel, to insure close contact between the plate and the panel.

5. A fertilizer spreader comprising an elongated, wheel-mounted bin with a series of feed openings in the bottom thereof; means to move the bin transversely of its elongation; a shaft in the bin parallel with its elongation; a series of agitator units secured to said shaft, one above each feed opening, each agitator unit comprising a number of vanes and each vane having a discharge portion at maximum radial distance from the shaft and directly above the respective feed opening, each vane also having a suction portion formed of sheet material extending parallel with the shaft and tapering from said radial distance to a closer radial distance from the shaft.

6. A fertilizer spreader comprising a bin with an apertured bottom; a shaft extending substantially through the bin; means to propel the bin and to rotate the shaft; an agitator unit secured to said shaft for the agitation of fertilizer in the bin and discharge thereof through the apertured bottom, the agitator unit comprising a number of similar, angularly spaced vanes, the bottom of the bin having a radius of curvature longer than the maximum radius of the agitator units a center of such curvature above said shaft, and the vanes having peripheral discharge portions and more central suction portions extending parallel with the shaft.

7. A fertilizer spreader comprising an elongated wheel-mounted bin with a series of feed openings in the bottom thereof; means to move the bin transversely of its elongation; a shaft in the bin parallel with its elongation; a series of agitator units secured to said shaft, one above each feed opening, each agitator unit comprising a number of angularly spaced vanes; each feed opening having two parallel marginal flanges upstanding inwardly of the bin, extending in planes parallel to the plane of rotation of the respective agitator unit, and at least some of the vanes having, at their outermost parts, discharge members approximately as wide as the space between the parallel flanges.

8. A fertilizer spreader according to claim 7 wherein the vanes have, in addition to said outermost parts, suction portions extending parallel with the shaft and tapering inwardly toward said shaft.

9. A fertilizer spreader according to claim 8 wherein the vanes have substantially square cornered offset portions between said outermost and tapered parts, each offset portion being approximately as wide as one of said upstanding flanges.

10. A fertilizer spreader according to claim 7 wherein each vane is reinforced at one lateral edge thereof by a strip integral therewith, said strip lying substantially in the plane of rotation of the vane, and forming a bucket with the outermost part of the vane.

References Cited in the file of this patent

UNITED STATES PATENTS

| Number | Name | Date |
|---|---|---|
| 509,856 | Allen | Dec. 5, 1893 |
| 1,650,808 | Van Brunt | Nov. 29, 1927 |
| 1,795,660 | Mayer | Mar. 10, 1931 |
| 1,888,821 | Fearn | Nov. 22, 1932 |
| 1,903,874 | Mills et al. | Apr. 18, 1933 |
| 1,940,606 | Ryan | Dec. 19, 1933 |
| 2,064,504 | Thompson | Dec. 15, 1936 |
| 2,510,231 | Juzwiak | June 6, 1950 |
| 2,541,008 | Stahmer II et al. | Feb. 6, 1951 |
| 2,603,383 | Wilson | July 15, 1952 |
| 2,618,405 | Morris | Nov. 18, 1952 |
| 2,620,094 | Swenson | Dec. 2, 1952 |